United States Patent Office 2,842,424
Patented July 8, 1958

2,842,424

PROCESS FOR SEPARATING NIOBIUM AND TANTALUM FROM MATERIALS CONTAINING THESE METALS

Waldemar Schornstein, Arlesheim, and Fritz Kern, Binningen, Switzerland, assignors to Ciba Limited, Basel, Switzerland, a Swiss firm No Drawing. Application February 24, 1956
Serial No. 567,475

Claims priority, application Switzerland March 1, 1955

7 Claims. (Cl. 23—18)

It is known that the two chemically related metals tantalum and niobium (also known in certain countries as columbium), which are generally found together in nature, are very difficult to separate from one another.

So far as is known, the method of separation is still substantially that of Marignac (1865). The method of Marignac involves the fractional crystallization of the alkali double fluorides, whereby the more sparingly soluble $K_2TaF_7$ is separated from the solution containing $K_2NbOF_5$. The main disadvantage of this method is that it necessitates working with hydrofluoric acid.

The process described in French Patent No. 973,896, which involves the selective chlorination of materials which contain niobium and tantalum in oxidized form, is carried out in the absence of reducing gases but at very high temperatures (about 1200° C.). The method of separation by forming the nitrides followed by halogenation as described in United States Patent Number 2,427,360, and also the process described in United States Patent Number 2,244,254 in which the niobium constituent is first selectively reduced at 600–1200° C. and then chlorinated, both necessitate two high temperature treatments.

The method of separation described in United States Patent No. 2,537,316 depends on the reduction of the accompanying elements in a more or less colloidal solution or suspension obtained by the digestion of the ore with, for example, sulfuric acid, followed by selective hydrolysis, in which the reduced accompanying elements remain in solution. The method therefore uses very unstable solutions, and the digestion with sulfuric acid is a lengthy process.

Finally, it is very difficult to maintain the working conditions in the potassium oxalate hydrolysis described in United States Patent No. 2,481,584.

The present invention is based on the observation that niobium and tantalum can be separated from one another in an advantageous manner by converting a material which contains niobium and tantalum in oxidized form, for example, a slag or more especially a concentrate or an ore, which may have been treated to enrich the concentration of these metals, or a mixture of oxides of these metals, by means of chlorine gas and a reducing agent into a chlorination mixture which contains the niobium preponderantly or exclusively in the form of its oxychloride and the tantalum in the form of its pentachloride, and separating the tantalum pentachloride from the said mixture by extraction with an inert solvent with the exclusion of moisture.

As starting materials for the present process there may be used the ordinary mixtures available in industry which contain oxides of niobium and tantalum or natural products which contain these two elements mostly in the form of their oxides.

The chlorination mixtures, which contain the tantalum for the greater part in the form of its pentachloride ($TaCl_5$) and the niobium for the greater part in the form of its oxychloride can be produced by methods in themselves known, for example, by chlorinating a mixture of the oxides of niobium and tantalum with chlorine gas and a reducing agent, such as carbon, at 400–1000° C. in a shaft furnace or a horizontal tube furnace. In order to obtain the niobium predominantly or exclusively in the form of its oxychloride and tantalum predominantly or exclusively in the form of its pentachloride, it is necessary to avoid subsequent reaction of the chlorination products. Therefore, the vapours of the chlorination products must be allowed to remain at high temperature in contact with one another and with the waste chlorination gases, which may contain carbon monoxide and chlorine, only for an extremely short time, that is to say, at most for a few seconds. This can be achieved for example, by dilution with other gases, for example, with returned chloride-free reaction gas, or by providing between the chlorination vessel and the condenser a conduit which is very short or of very small cross-section.

Owing to the tendency of niobium to form oxychlorides there can be obtained by these methods a chlorination mixture which contains the niobium predominantly or wholly in the form of oxychloride and the tantalum predominantly or wholly in the form of its pentachloride.

The elements, other than niobium and tantalum, which are customarily present in the form of compounds as impurities in the starting materials, and of which the chlorides are also formed during the chlorination, for example, the chlorides of titanium, tin, manganese etc., can be separated in a simple manner, for example, by so adjusting the temperature in the chlorination vessel and in the condenser that the chlorides of the accompanying elements, whose boiling or volatilizing points are generally far removed from those of the chlorides of niobium and tantalum, are separated to a very great extent from the latter chlorides. Thus, for example, the less volatile chloride of magnanese may be separated first, while the more volatile chlorides, for example, those of silicon, tin and titanium, precipitate after the chlorination mixture containing niobium and tantalum has been condensed, for example, in condensation zones of lower temperature.

Mixtures of tantalum pentachloride and niobium oxychloride to be separated into their constituents in accordance with the invention can also be obtained by a process of the kind referred to which is carried so far as to produce predominantly a mixture of niobium pentachloride and tantalum pentachloride followed by a selective hydrolysis, for example, by means of steam or oxidehydrates, or by the selective oxidation of the more easily oxidizable niobium pentachloride in the mixture of the pentachlorides so obtained.

The extraction of the mixture so obtained, in which the tantalum is present predominantly or wholly as its pentachloride and the niobium is present predominantly or wholly as its oxychloride, is carried out by means of an inert solvent with the exclusion of moisture. As an inert solvent there is to be understood a single solvent or mixture of solvents which is inert towards the chlorides of niobium and tantalum, that is to say, which does not react with these chlorides. As such solvents there may be used either organic or inorganic solvents. As organic solvents there may be mentioned aliphatic or aromatic, and preferably halogenated compounds, such as bromoethane, phosgene, carbon tetrachloride or chlorethane, and among the inorganic solvents there are useful titanium tetrachloride, silicon tetrachloride, tin tetrachloride, phosphorus trichloride, and especially solvents containing sulfur and oxygen such as thionyl chloride, sulfuryl chloride and above all sulfur dioxide.

The extraction may be carried out by treating the chlorination mixture in the absence of moisture once or several times with an inert solvent or mixture of inert solvents, and separating the solution containing chiefly the pentachloride from the undissolved substances.

The treatment of the mixture of chlorine compounds of niobium and tantalum with the aforesaid solvents may be carried out in known manner, for example, under atmospheric pressure and at room temperature or at a raised temperature, for example, at the boiling point of the solvent used, batchwise or in a continuous manner. In certain cases it is necessary to work under superatmospheric pressure. Thus, for example, the mixture may be treated with sulfur dioxide at room temperature and under a pressure corresponding to the vapour pressure of sulfur dioxide, for example, in a mixing or grinding apparatus or continuously on the counter-current principle.

After the extraction, the extracted chloride can be separated from the solvent in known manner, for example, by distilling off the solvent, by precipitation and filtration or by cooling and crystallization, and then the chloride may be further worked up. The insoluble substances may be purified, for example, by sublimation. The solvent recovered after removing the chloride dissolved therein can of course be used in further extractions.

By the process of this invention mixtures containing niobium and tantalum which are difficult to split up into their constituents can be split up into fractions, one of which contains mainly tantalum and the other mainly niobium.

The following examples illustrate the invention, the parts and percentages being by weight:

EXAMPLE 1

Briquettes containing 30 percent of sugar charcoal and 35 percent each of niobium pentoxide and tantalum pentoxide were chlorinated in a current of chlorine at 1000° C., and the volatile chlorination products were rapidly condensed by cooling in an air-cooled condenser chamber.

2.5 parts of the resulting chlorination product, which had been finely pulverized with the exclusion of moisture, were extracted under a pressure corresponding to the vapour pressure of sulfur dioxide three times with about 30 parts of liquid sulfur dioxide, that is to say, until the extract contained no appreciable amounts of chloride. The three extracts were separately freed from solvent by evaporation.

The first extract, which contained about 90 percent of the extractable material (equal about 1.05 parts), was analyzed for its content of niobium and tantalum. It contained 22.8 percent of niobium and 77.2 percent of tantalum (calculated as $Nb_2O_5$ and $Ta_2O_5$, respectively).

The residue insoluble in sulfur dioxide (about 1.35 parts) was split up by sublimation in vacuo (0.1 mm. pressure of mercury) into a sublimation residue $R_s$ and a sublimate S, and the two fractions were analyzed for niobium and tantalum.

Analysis

|  | Sublimate S (1.12 parts) | Residue $R_s$ (0.23 part) |
|---|---|---|
| Percent $Nb_2O_5$ | 90.9 | 13.0 |
| Percent $Ta_2O_5$ | 9.1 | 87.0 |

Thus three fractions were obtained of which two, the extract and the sublimation residue, contain mainly tantalum, and of which the third, the sublimate from the extraction residue, contained mainly niobium.

EXAMPLE 2

A mixture of 25 percent of sugar charcoal and 75 percent of a mixture of equal quantities of niobium pentoxide and tantalum pentoxide was chlorinated at 550° C. or 600° C. in a current of chlorine, and the volatile products were precipitated by rapid cooling in an air-cooled condenser.

10 parts of the product so obtained were finely pulverized with the exclusion of moisture and extracted under a pressure corresponding to the vapour pressure of sulfur dioxide three times with about 100 parts of liquid sulfur dioxide, the extract on the third occasion containing no appreciable amounts of dissolved substance. The extracts were freed from solvent by evaporation.

The combined extracts, which contained X% (see Table 1) of the niobium and tantalum (calculated as oxides) present in the original chlorination product, were analyzed for the ratio of niobium and tantalum (calculated as oxides) contained therein. The combined extracts contained $a$ percent of $Nb_2O_5$ and $b$ percent of $Ta_2O_5$ (see Table 1).

The residue insoluble in sulfur dioxide (containing $Y+Z$ percent of the metals present in the original chlorination mixture) were split up by sublimation in vacuo (at 0.1 mm. pressure of mercury) into a sublimation residue $R_s$ and a sublimate S, and the two fractions were analyzed for niobium and tantalum. The sublimate S, containing Y percent of niobium and tantalum (calculated as oxides) had a content of $a$ percent of $Nb_2O_5$ and $b$ percent of $Ta_2O_5$, and the sublimation residue $R_s$, containing Z percent of niobium and tantalum, had a content of $a$ percent of $Nb_2O_5$ and $b$ percent of $Ta_2O_5$ (see Table 1).

TABLE 1

| | Extract E | | | Sublimate S | | | Residue $R_s$ | | |
|---|---|---|---|---|---|---|---|---|---|
| Temp., °C. | Percent of the chlorination product X | $Nb_2O_5$ $a$ | $Ta_2O_5$ $b$ | Percent of the chlorination product Y | $Nb_2O_5$ $a$ | $Ta_2O_5$ $b$ | Percent Z | $Nb_2O_5$ $a$ | $Ta_2O_5$ $b$ |
| 550 | 47 | 21 | 79 | 41 | 94 | 6 | 12 | 21 | 79 |
| 600 | 46 | 22 | 78 | 39 | 87 | 13 | 15 | 30 | 70 |
| 600 | 39 | 26 | 74 | 46 | 87 | 13 | 15 | 8 | 92 |
| 600 | 42 | 22 | 78 | 45 | 89 | 11 | 13 | (¹) | (¹) |
| 600 | 48 | 18 | 82 | | | | | | |

¹ Not analyzed.

EXAMPLE 3

1 part of a niobium-tantalum mixture, which consisted of about 43 per cent of niobium (calculated as $Nb_2O_5$) and about 57 percent of tantalum (calculated as $Ta_2O_5$) and had been finely pulverized with the exclusion of moisture, and which contained the niobium as $NbOCl_3$ and the tantalum as $TaCl_5$, was extracted several times with 5 parts of sulfuryl chloride on each occasion until the extract contained no appreciable quantities of extracted substance (that is to say, extracted seven times with 5 parts of sulfuryl chloride on each occasion). The residue was separated from the solution each time by centrifuging and decanting, and the extracts were freed from sulfuryl chloride by evaporation.

The extracts so obtained contained together 60 per cent (calculated as oxides) of the metals present in the original mixture, of which 93 percent was tantalum and 7 percent niobium, and the residue insoluble in sulfuryl chloride contained 98 percent of niobium and 2 percent of tantalum.

EXAMPLE 4

One part of a mixture of $NbOCl_3$ and $TaCl_5$, which had been finely pulverized with the exclusion of moisture, was extracted three times with 10 parts of sulfur dioxide on each occasion. Two further portions of 1 part each of the same mixture were separately extracted, one three times with 5 parts of thionyl chloride on each occasion, and the other three times with 5 parts of bromethane on each occasion. The residues were separated from the solutions, by filtration in the case of the extraction with sulfur dioxide, and by centrifuging and decanting in the case of the extractions with thionyl chloride and bromethane. The extracts were freed from solvent by evaporation.

The extracts and the residues were then analyzed for their contents of niobium and tantalum (calculated as oxides). The contents of niobium and tantalum in the chloride mixture and also the proportions in the extracts and residues of the niobium and tantalum (calculated as oxides) originally present are given in Table 2.

and sulfur dioxide and the resulting solution is separated from the undissolved fraction of the chlorination products.

4. Process according to claim 3 wherein there is used an inert solvent sulfur dioxide maintained in liquid phase by means of a pressure exceeding its vapor pressure at working temperature.

5. Process for separating niobium and tantalum from one another in materials containing these metals in oxidized form, wherein the material is heated at 400° C. to 1000° C. in the presence of carbon and chlorine gas, the vapors of the chlorination products leaving the chlorination zone are rapidly condensed, the condensed mixture is treated with liquid sulfur dioxide and the sulfur dioxide solution containing tantalum pentachloride is separated from the insoluble fraction of the mixture.

6. Process for separating niobium and tantalum from one another in materials containing these metals in oxidized form, wherein the material is heated at 400° C. to 1000° C. in the presence of carbon and chlorine gas, the vapors of the chlorination products leaving the chlorination zone are rapidly condensed, the condensed mixture is treated with liquid sulfur dioxide and the sulfur dioxide solution containing tantalum pentachloride is separated from the insoluble fraction of the mixture, the so-obtained insoluble fraction and the tantalum pentachloride fraction after having been freed from the sulfur dioxide by evaporation being each separately sublimed for purification by heating under reduced pressure.

7. Process for separating niobium and tantalum from one another, wherein a mixture of tantalum pentachloride

TABLE 2

| Solvent | Composition of the chloride mixture (calculated as oxides) | | Extract | | | | Residue | | |
|---|---|---|---|---|---|---|---|---|---|
| | $Nb_2O_5$ | $Ta_2O_5$ | No. | Percent of the starting mixture (calculated as oxides) | $Nb_2O_5$, Percent | $Ta_2O_5$, Percent | Percent of the starting mixture (calculated as oxides) | $Nb_2O_5$, Percent | $Ta_2O_5$, Percent |
| $SO_2$ | 43 | 57 | 1 | 56 | 2.0 | 98.0 | 44 | (¹) | (¹) |
| | 53 | 47 | 1 | 47 | 3.5 | 96.5 | 53 | (¹) | (¹) |
| | 43 | 57 | 1+2 | 58 | 2.0 | 98.0 | 42 | 100 | |
| $SOCl_2$ | 50 | 50 | 1 | 37 | 2.7 | 97.3 | 48 | 96.7 | 3.3 |
| | | | 2 | 12 | 9.5 | 90.5 | | | |
| | | | 3 | 3 | 22.0 | 78.0 | | | |
| | 42 | 58 | 1 | 57 | 4.0 | 96.0 | 36 | 99.5 | 0.5 |
| | | | 2 | 7 | (¹) | (¹) | | | |
| $C_2H_5Br$ | 45 | 55 | 1 | 51 | 1.6 | 98.4 | 35 | 99 | 1 |
| | | | 2 | 7 | 50.0 | 50.0 | | | |
| | | | 3 | 7 | (¹) | (¹) | | | |

¹ Not analyzed.

What is claimed is:

1. Process for separating niobium and tantalum from one another, wherein in a mixture containing tantalum pentachloride and niobium oxychloride the tantalum pentachloride is dissolved in an anhydrous solvent selected from the group consisting of thionyl chloride, sulfuryl chloride and sulfur dioxide, and the resulting solution is separated from the undissolved fraction of the starting mixture.

2. Process according to claim 1, wherein there is used an inert solvent sulfur dioxide maintained in liquid phase by means of pressure exceeding to its vapor pressure at working temperature.

3. Process for separating niobium and tantalum from one another in materials containing these metals in oxidized form, wherein the material is heated at 400° C. to 1000° C. in the presence of carbon and chlorine gas, the vapors of the chlorination products leaving the chlorination zone are allowed to remain at high temperature for at most a few seconds and wherein tantalum pentachloride is extracted from the mixture of chlorination products by an anhydrous inorganic solvent selected from the group consisting of thionyl chloride, sulfuryl chloride, and niobium oxychloride is brought into contact with anhydrous liquid sulfur dioxide, the resulting solution containing tantalum pentachloride is separated from the insoluble fraction of the mixture and freed from sulfur dioxide by evaporation, both fractions so obtained being thereafter sublimed for purification by being heated separately under reduced pressure and condensing the volatilized products.

References Cited in the file of this patent
UNITED STATES PATENTS
2,443,254    Kroll _____ June 15, 1948

FOREIGN PATENTS
507,124    Great Britain _____ June 9, 1939

OTHER REFERENCES
J. W. Mellor's "A Comprehensive Treatise on Inorganic and Theoretical Chemistry," vol. 9, 1929 edition, pages 878, 879, 921. Longmans, Green & Co., N. Y.

"Thorpe's Dictionary of Applied Chemistry," vol. 3, 4th edition (1939), page 312, Longmans, Green & Co., N. Y.

UNITED STATES PATENT OFFICE

CERTIFICATE OF CORRECTION

Patent No. 2,842,424                                         July 8, 1958

Waldemar Schornstein et al.

It is hereby certified that error appears in the printed specification of the above numbered patent requiring correction and that the said Letters Patent should read as corrected below.

Column 1, line 16, for "nioblum" read -- niobium --; line 34, for the patent number "2,444,254" read -- 2,443,254 --; column 5, line 60, for "an" read -- as --; line 61, strike out "to"; column 6, line 4, for "an" read -- as --.

Signed and sealed this 24th day of March 1959.

(SEAL)
Attest:

KARL H. AXLINE
Attesting Officer

ROBERT C. WATSON
Commissioner of Patents